United States Patent [19]

O'Gwynn

[11] Patent Number: 4,631,605
[45] Date of Patent: Dec. 23, 1986

[54] MULTIPLE SPEED SCANNER SERVO SYSTEM FOR PROTECTING THE HEADS AND TAPE OF HELICAL RECORDERS

[75] Inventor: David C. O'Gwynn, Colorado Springs, Colo.

[73] Assignee: Ampex Corporation, Redwood City, Calif.

[21] Appl. No.: 653,651

[22] Filed: Sep. 20, 1984

[51] Int. Cl.⁴ .................. G11B 15/66; G11B 5/52
[52] U.S. Cl. .................................. 360/70; 360/73; 360/84
[58] Field of Search .................. 360/10.1–10.3, 360/69, 70, 84, 85, 73; 318/603

[56] References Cited

U.S. PATENT DOCUMENTS

| | | | |
|---|---|---|---|
| 3,783,200 | 1/1974 | Jantzen et al. | 360/85 |
| 4,001,885 | 1/1977 | Ikushima | 360/85 |
| 4,161,002 | 7/1979 | Saito | 360/84 |
| 4,514,671 | 4/1985 | Louth | 318/603 |
| 4,536,806 | 8/1985 | Louth | 360/69 |

Primary Examiner—Donald McElheny, Jr.
Assistant Examiner—Steven R. Garland
Attorney, Agent, or Firm—George B. Almeida; Joel D. Talcott

[57] ABSTRACT

A multiple speed servo is provided which measures and controls the speed of a head scanner below approximately 900 rpm, to maintain a preselected, relatively reduced, scanner speed which is fast enough to aid threading and unthreading tape about the scanner in the reverse direction, but not fast enough to damage the heads or tape. The safe handling is enhanced by selectively reducing the tape speed during reverse threading and unthreading of the tape, to maintain a preferred ratio of scanner circumferential velocity equal to, or slightly greater than, the tape speed. To this end, a slow speed scanner servo is employed to continually monitor and maintain the scanner at the preselected reduced scanner speed while the tape is maintained at the associated reduced tape speed.

20 Claims, 12 Drawing Figures

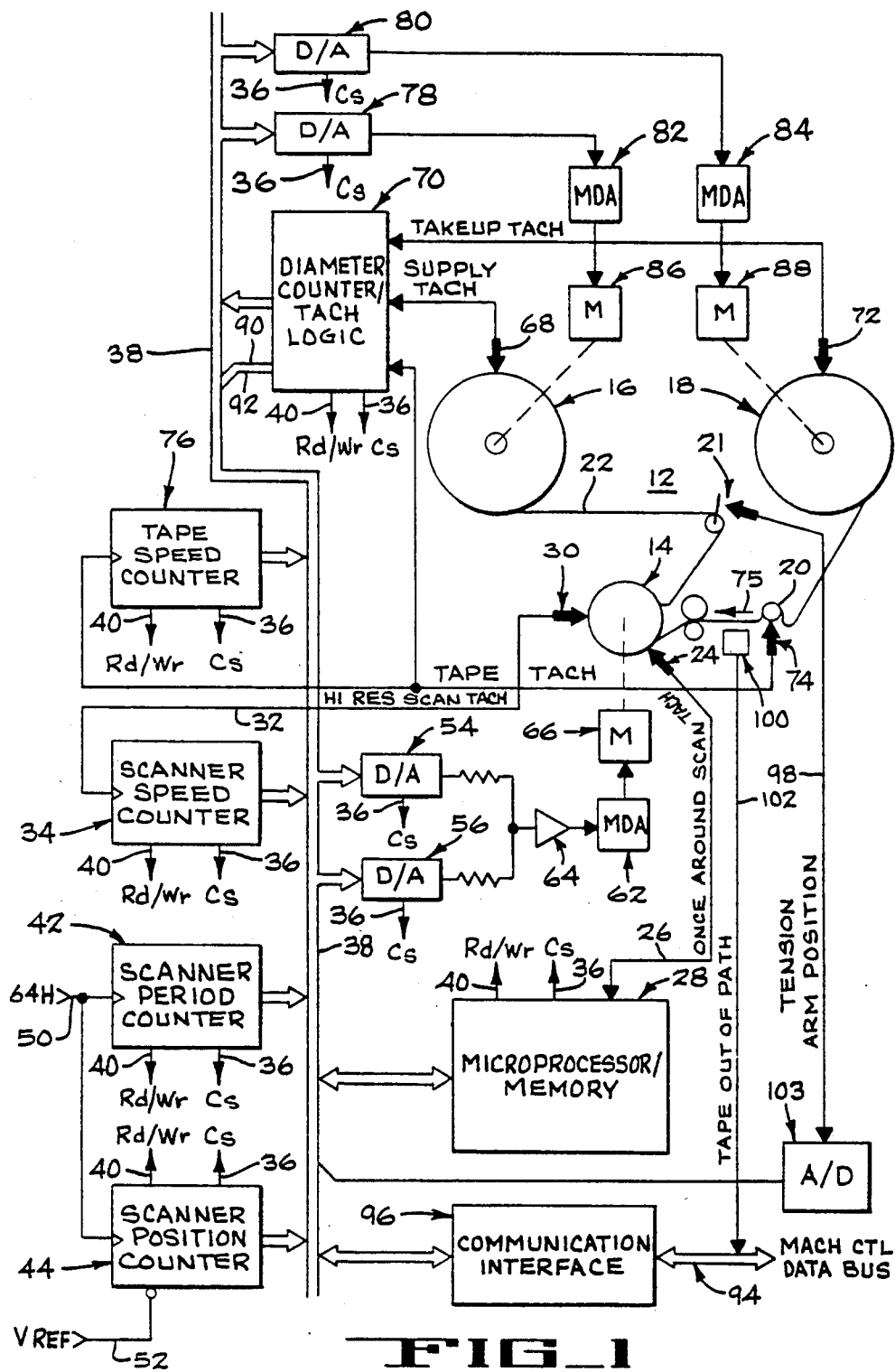
FIG_1

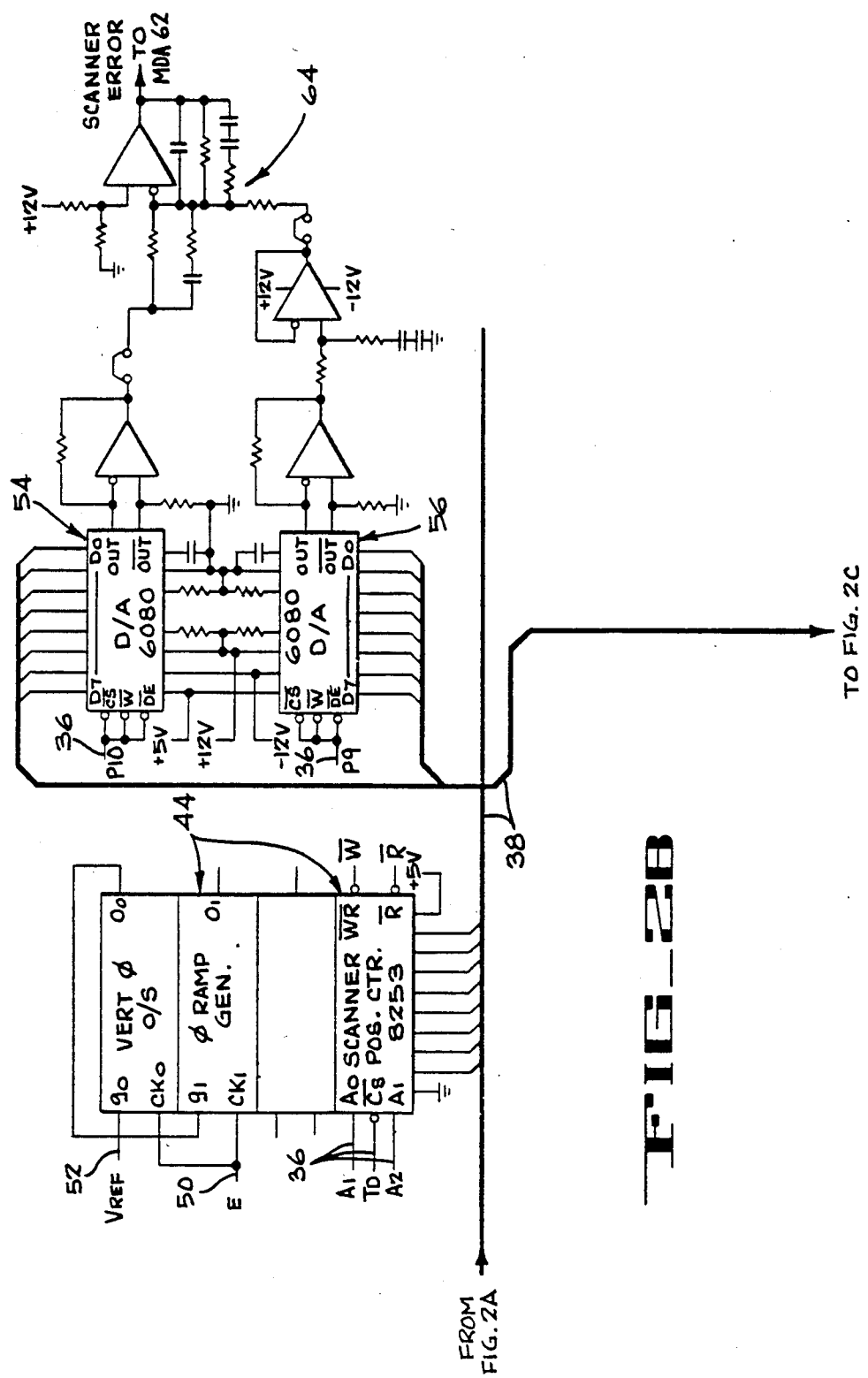
FIG_2B

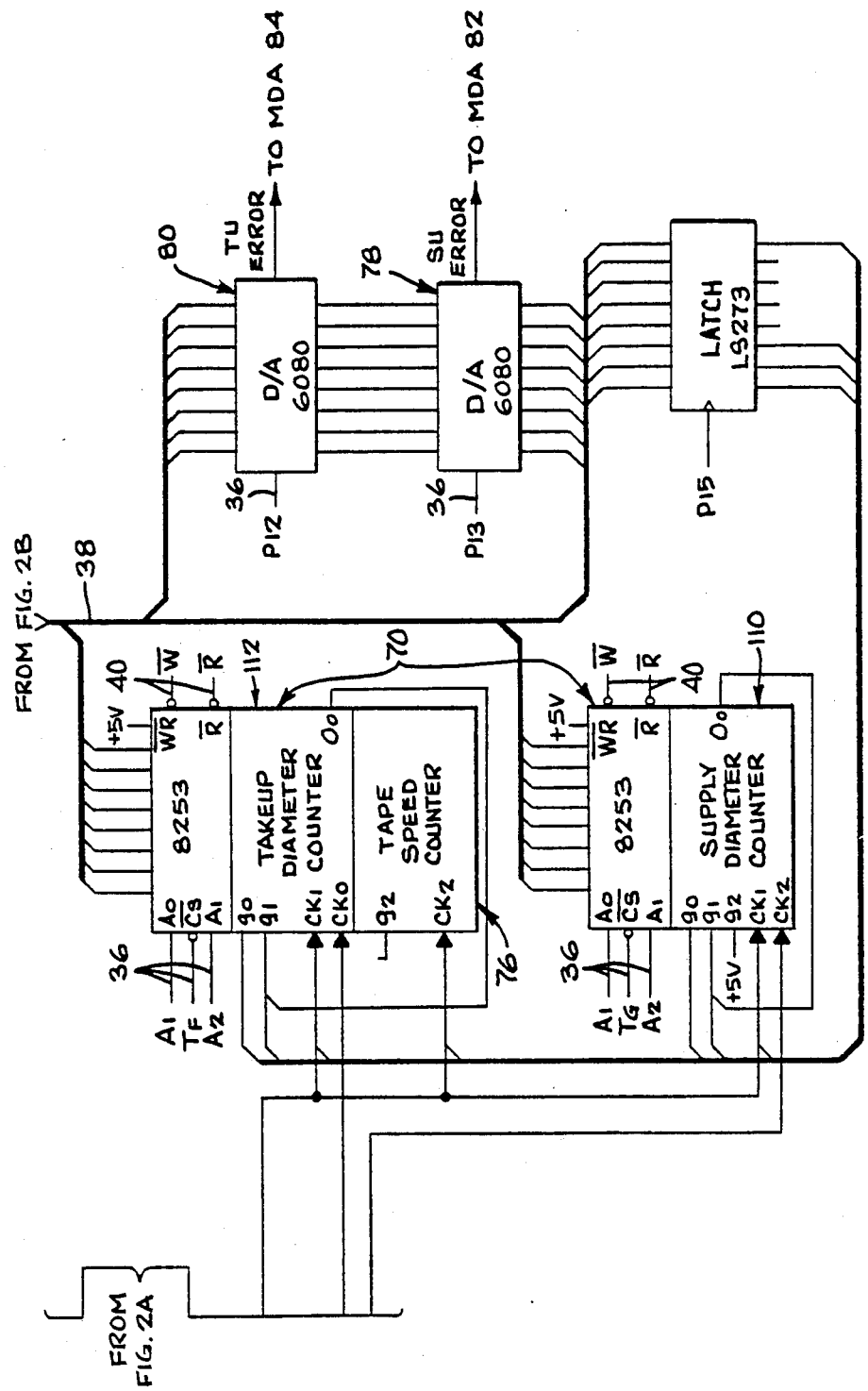

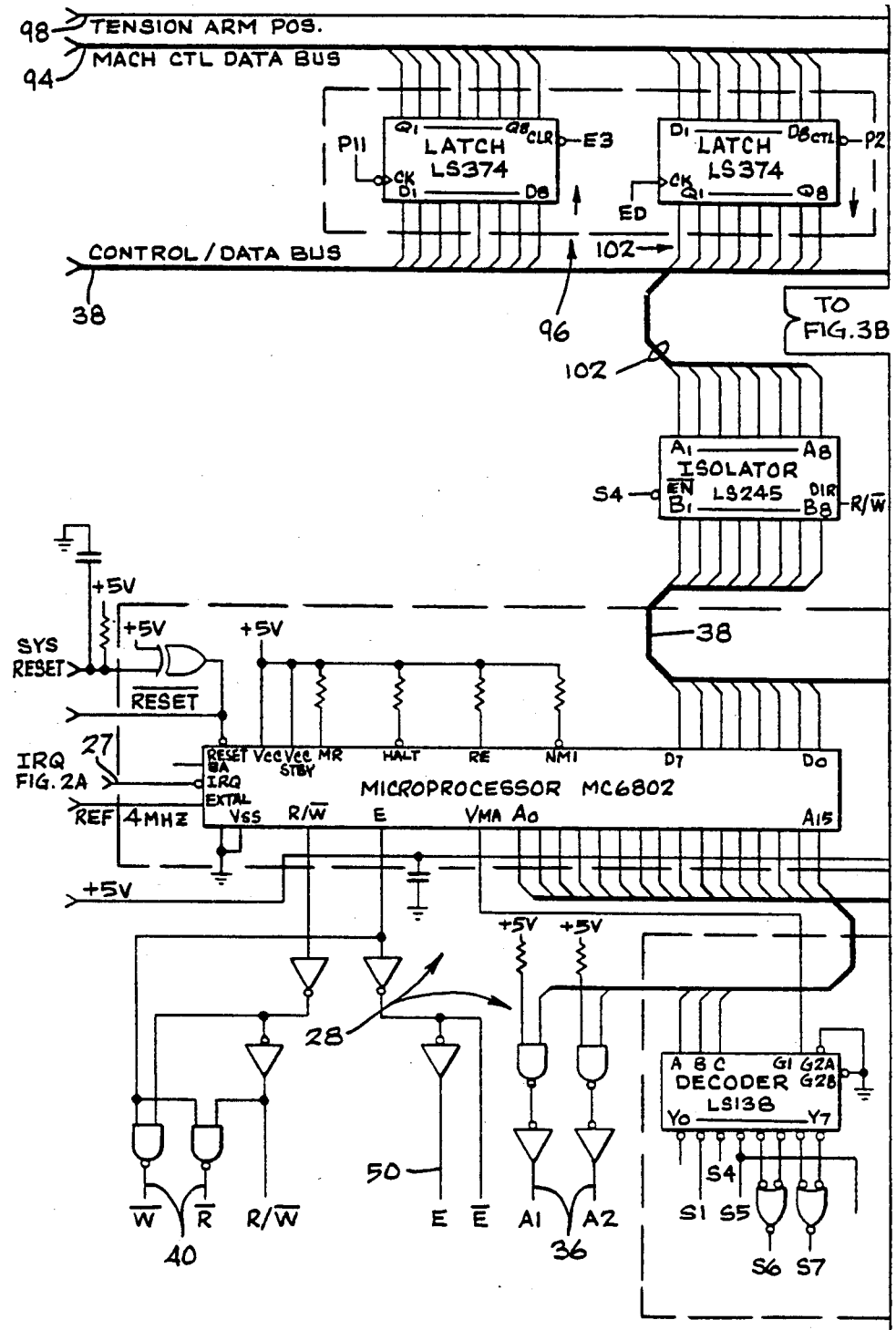
FIG_3A

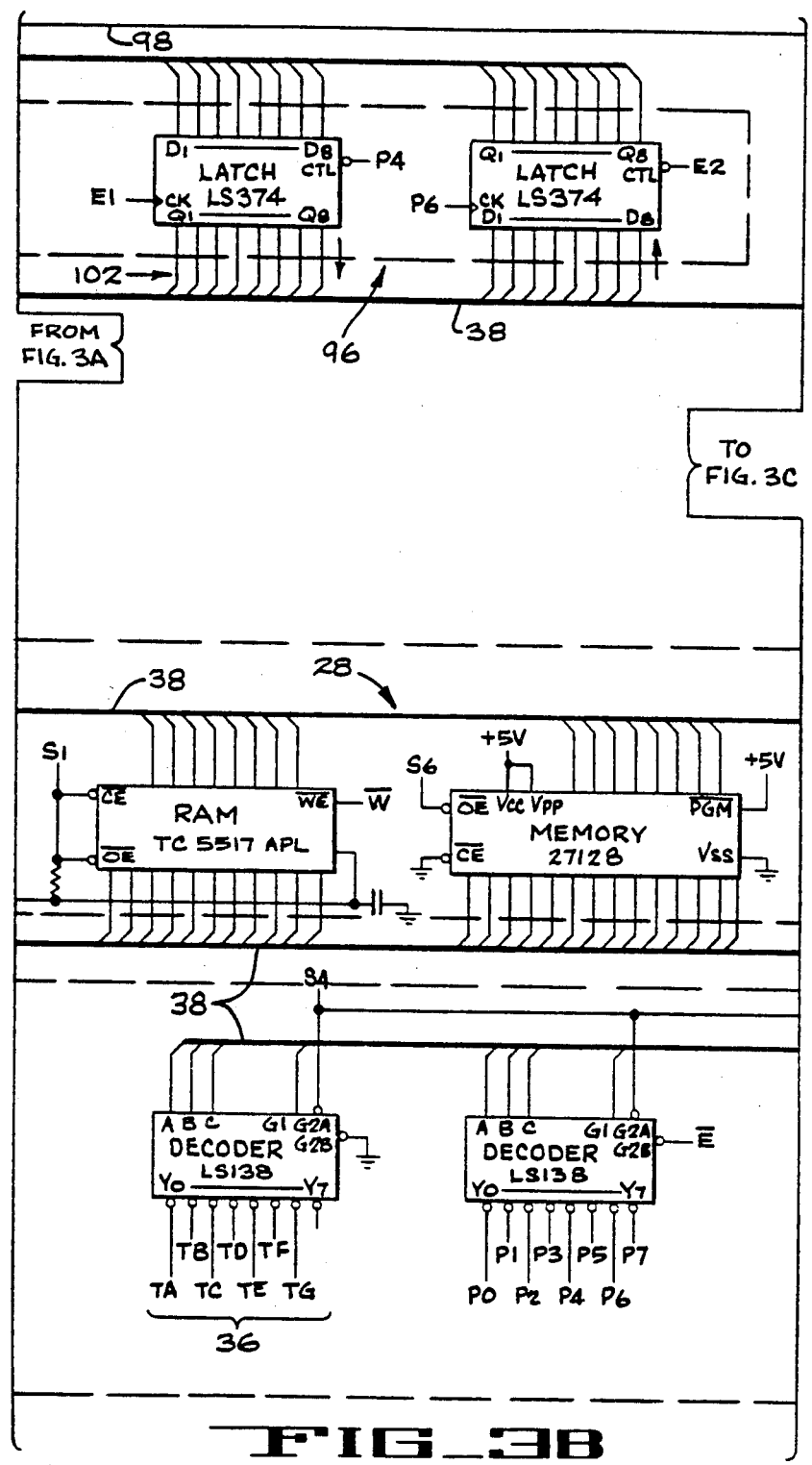
FIG_3B

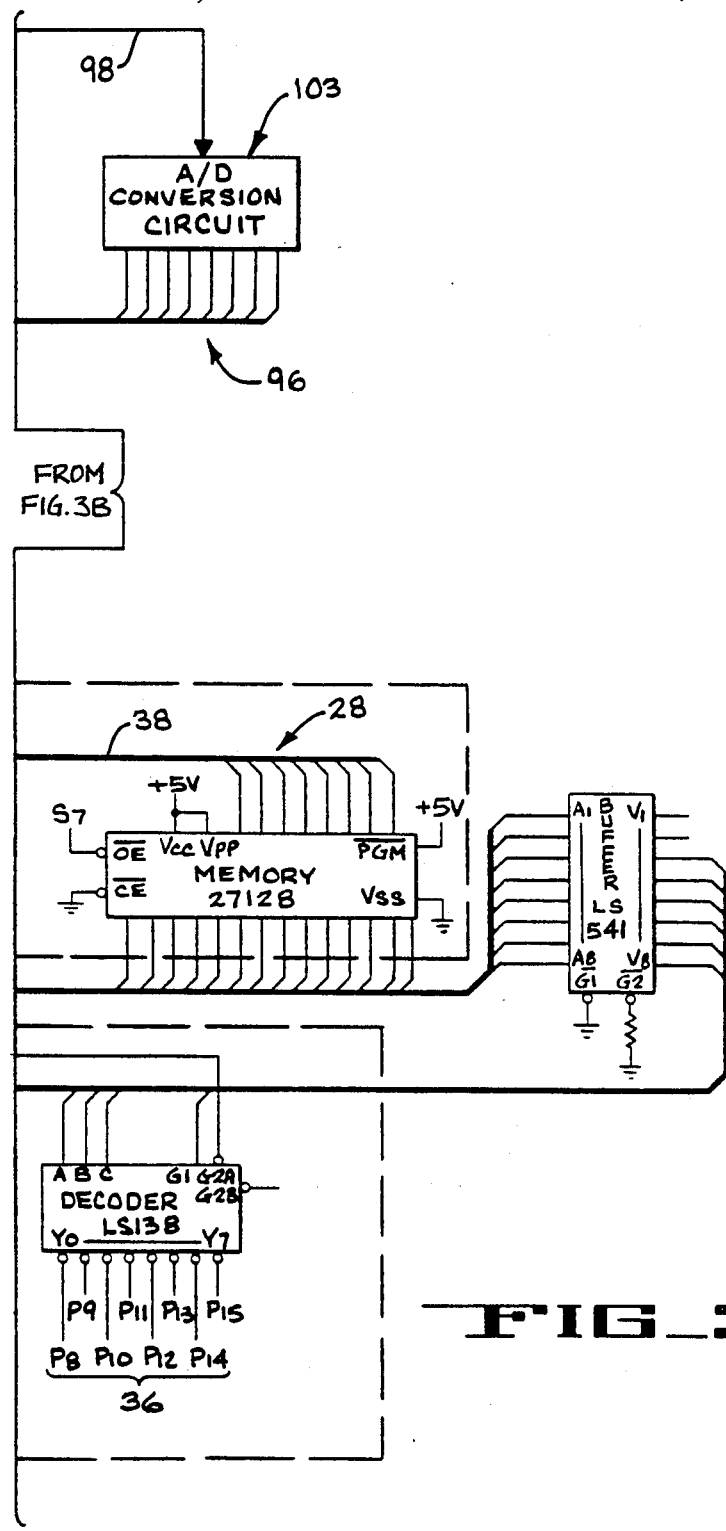
FIG_3C

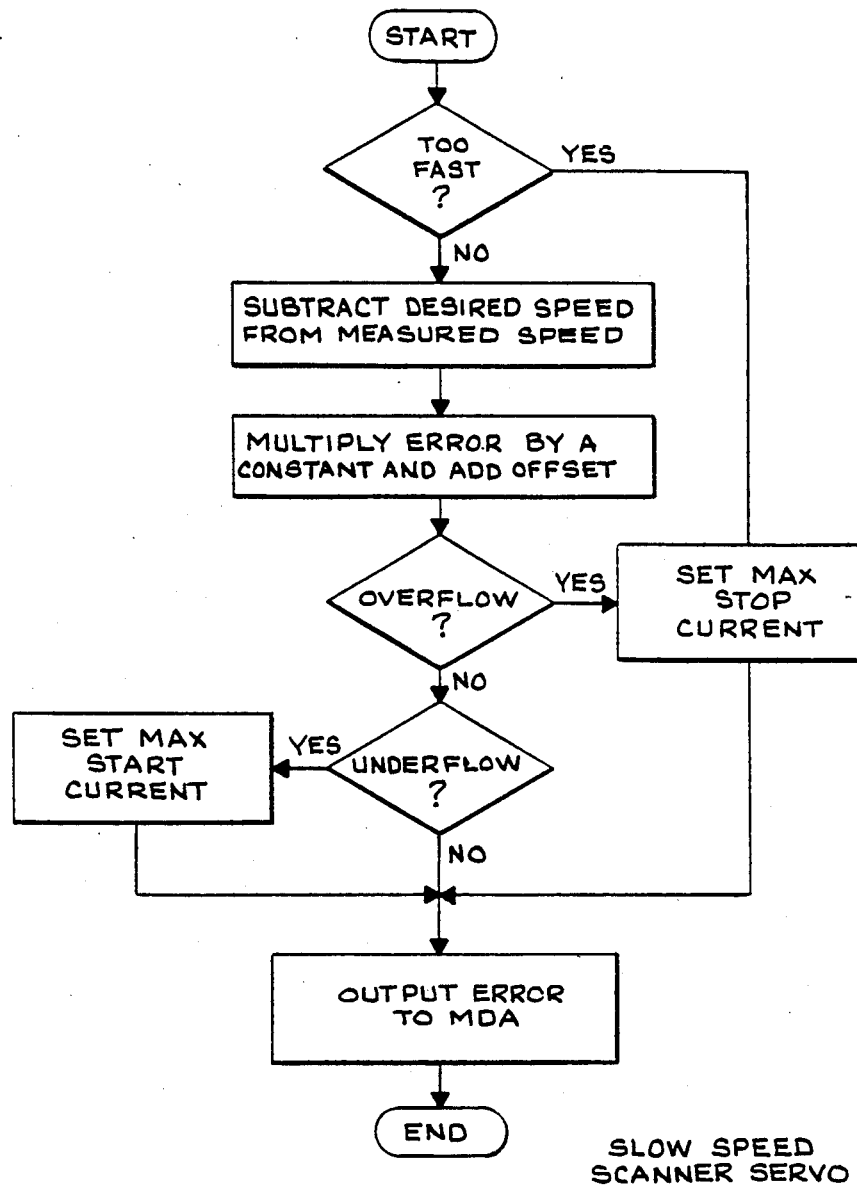
FIG 4 — SLOW SPEED SCANNER SERVO

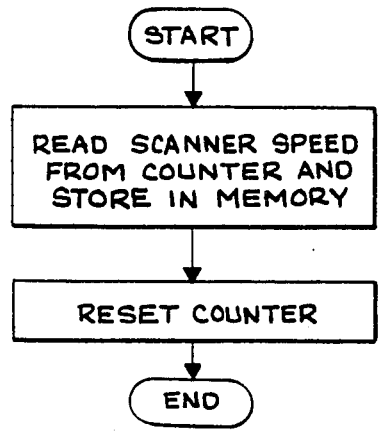
SCANNER SPEED
MEASUREMENT
FIG_5
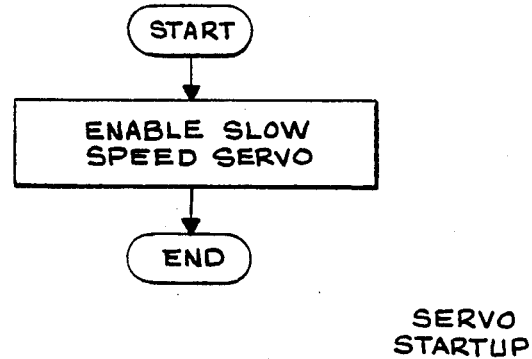
SERVO
STARTUP
FIG_6

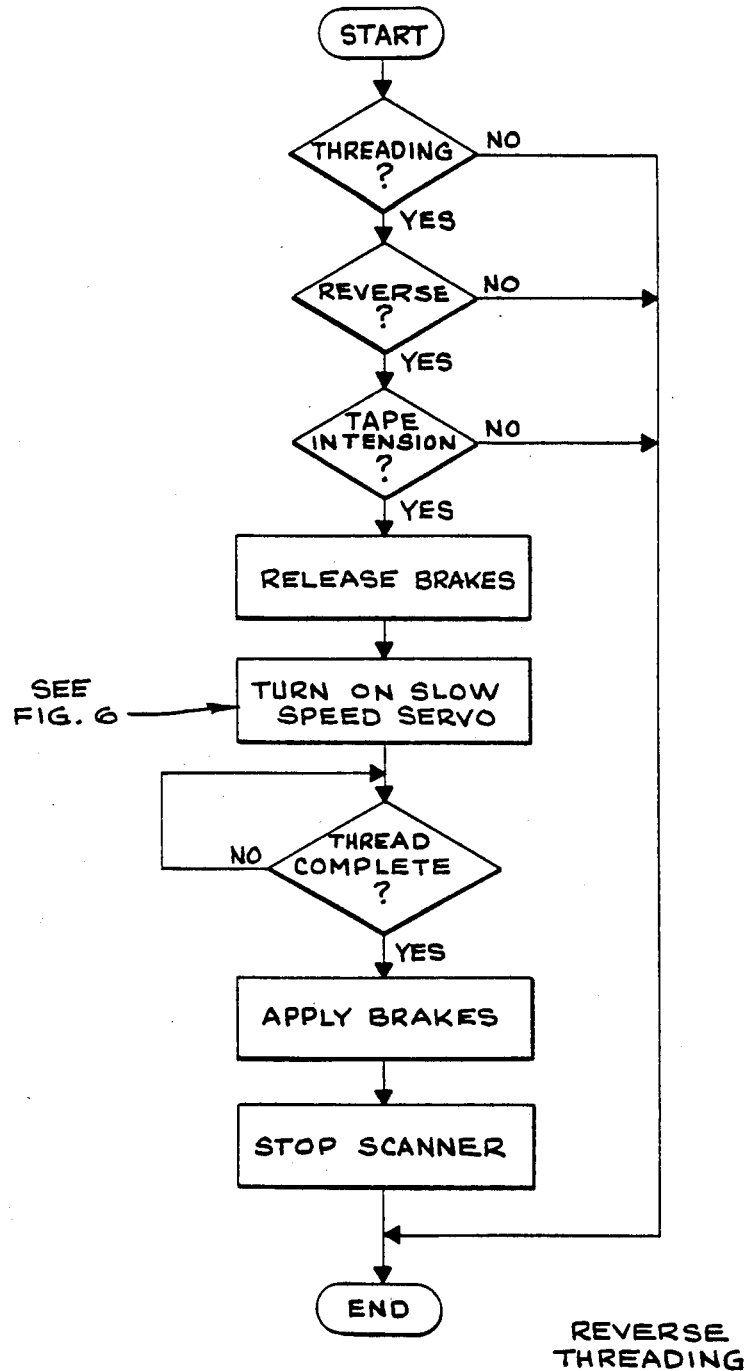
FIG_7

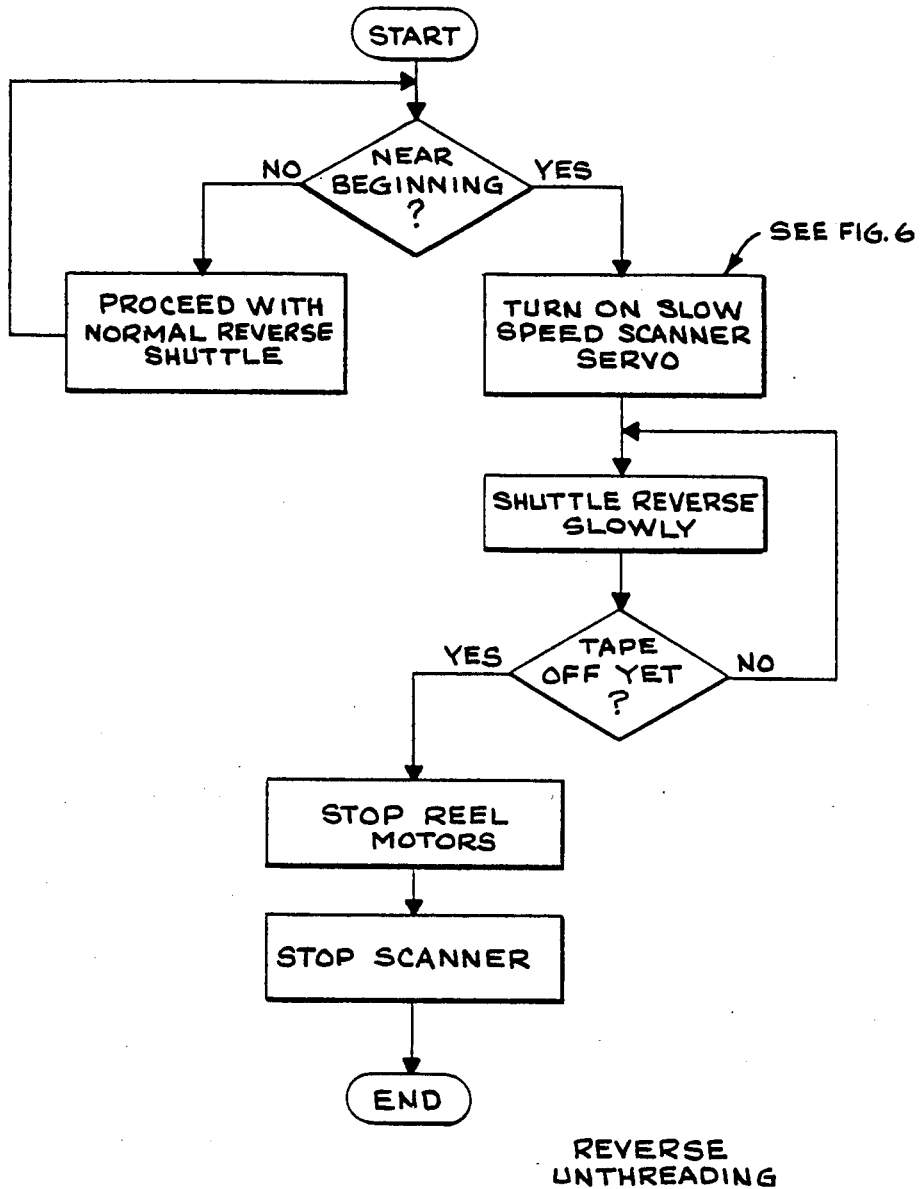
FIG_8 REVERSE UNTHREADING

MULTIPLE SPEED SCANNER SERVO SYSTEM FOR PROTECTING THE HEADS AND TAPE OF HELICAL RECORDERS

BACKGROUND AND SUMMARY OF THE INVENTION

The invention relates to an improvement in the handling of tape in a helical video tape recorder when in selected operating modes, and particularly to the prevention of damage to the tape or to the video heads when threading or unthreading tape in the reverse direction about a helical scanner drum.

In helical tape recorders, a problem which occurs all too frequently when threading a tape backwards from the takeup reel to the supply reel of the transport when the scanner drum is stopped, is that the tape tends to slide up and off the scanner drum as it is pulled through the transport during the threading process. This effect is commonly termed "barber pole" in the art, and can cause severe damage to the tape. An additional and similar problem arises in such transports, when tape is withdrawn from the takeup reel and from the tape path in the reverse direction, while the scanner drum is rotating at normal high speed. In such a situation, since the scanner drum rotates in the direction the tape is moving, it pulls the approaching end of the tape from the takeup reel, into the scanner and against the tape guide. The latter condition not only damages the tape but also may destroy the fragile video heads, particularly if the tape end is not smooth and flat. The above condition may occur whenever the scanner is rotating at its normal high speed and the tape is withdrawn in the reverse direction, either during reverse shuttle or reverse playback modes of transport operation.

To date, no attempt has been made to correct the first problem of damage to a tape when performing the reverse threading operation. Operators of tape transports have instead simply tried to exercise special caution when reverse threading tape to prevent the barber pole effect. However as well known the average operator in the field is notoriously careless in handling tape particularly when hurrying. Thus all too often tape is damaged. Attempts have been made in the art to prevent the occurrence of the second problem of damage during the reverse unthreading of tape, but such attempts have not proved very successful. One of the approaches is of a mechanical nature, wherein the tape guides which maintain the tape against the scanner drum are rotated away from the scanner as the end of the tape approaches. This alleviates the above problem associated with unthreading the tape in the reverse direction. However, the retractable guide approach involves the addition of relatively complex mechanical apparatus and associated electrical controls, which combination further tends to be relatively unreliable. Such scheme also fails to prevent the barber pole effect when threading tape in the reverse direction.

In another scheme, the tape transport and thus the tape movement is stopped or slowed to an acceptable low speed as the tape end approaches. In this scheme, the end-of-tape is determined in conventional manner and the drives to the capstan motor and to the reel motors are electrically braked and disabled respectively, to stop the tape while the scanner continues to rotate. Such a scheme generally is possible only on very sophisticated tape transports employing dynamic braking and very powerful reel motors, while further employing relatively complex reel motor servos. This scheme also fails to prevent the barber pole effect when threading tape in the reverse direction.

In another approach, electrical controls are applied both to the reel motors and to the scanner, in response to the determination of a selected nominal reel hub diameter corresponding to end-of-tape. The shuttle speed of the transport is decreased to an acceptable speed, and the scanner drive is turned off to allow the scanner to coast to a stop as the tape is pulled from the scanner. This latter scheme provides moderate but unpredicable protection from the above-mentioned problems, since the scanner is coasting in uncontrolled fashion and thus is rotating at an unknown speed. This is partly due to the fact that the end-of-tape is not precisely known and can vary as much as 100 to 200 wraps about the reel hub. If the scanner rotational speed is excessive at the moment when the tape end is pulled from the scanner, the tape or heads may be damaged. If the rotation is too slow, the tape will barber pole up the scanner also resulting in tape damage. This scheme also fails to prevent the barber pole effect when threading tape in the reverse direction. This latter scheme is illustrated, for example, in the Ampex Corporation, VPR-80 Video Production Recorder Manual 1809548, issued June, 1984.

In transports employing the latter scheme, a scanner tachometer produces a pulse once each revolution, which then causes an associated microprocessor to sample the present scanner period of rotation and angular position with respect to an external reference. These data are used to produce error signals that are fed to the scanner motor to maintain the normal record/playback scanner speed. Because the tachometer pulse occurs only once per revolution, and 16-bit counters are used to measure the period of rotation and angular position, such a scheme cannot measure or control the scanner at speeds below, for example, about 900 revolutions per minute (rpm). Such rotational speed is far too fast to allow safely threading or unthreading the tape in the reverse direction.

Accordingly, the invention combination provides for overcoming the problems discussed above; namely, allows gentle threading and unthreading of the tape while precluding the barber pole effect, when the tape is placed or withdrawn about the scanner drum in the reverse direction. More particularly, a slow speed scanner servo defined by a high resolution scanner tachometer (tach) and an additional counter to measure scanner speed when at substantially reduced values, is employed in combination with the generally conventional scanner servo means mentioned above for supplying the scanner period of rotation and angular position when at normal record/playback scanner speed. The slow speed scanner servo is selectively enabled during the reverse threading and unthreading modes of operation, to servo the scanner to maintain a preselected reduced speed selected from a possible range of speeds substantially below the normal scanner high speed. The pulses from the high resolution scanner tach are counted by the counter, and the counter then is sampled and reset once every television field. This allows measuring scanner speeds down to the order of ten rpm. In addition, the tape speed preferably is selected to also maintain a preselected reduced tape speed, whereby the system maintains a scanner circumferential velocity which is equal to, or slightly greater than, the tape speed. The ratio of speeds may vary commensurate with those preferred to safely perform the reverse threading, or the reverse unthreading, operation.

BRIEF DESCRIPTION OF THE DRAWINGS

FIG. 1 is a block diagram of the slow speed scanner servo in combination with scanner, reel and tape servo circuits in a tape transport.

FIG. 4 is a flow chart showing the operation of the slow speed scanner servo of FIGS. 1–3.

FIG. 5 is a flow chart showing the slow speed scanner speed measurement process.

FIG. 6 is a flow chart showing the start-up process for the slow speed scanner servo of FIGS. 1–3.

FIG. 7 is a flow chart showing the process for reverse threading of the tape on the transport.

FIG. 8 is a flow chart showing the process for reverse unthreading of the tape from the transport.

DETAILED DESCRIPTION OF THE EMBODIMENTS

Figure 2A:
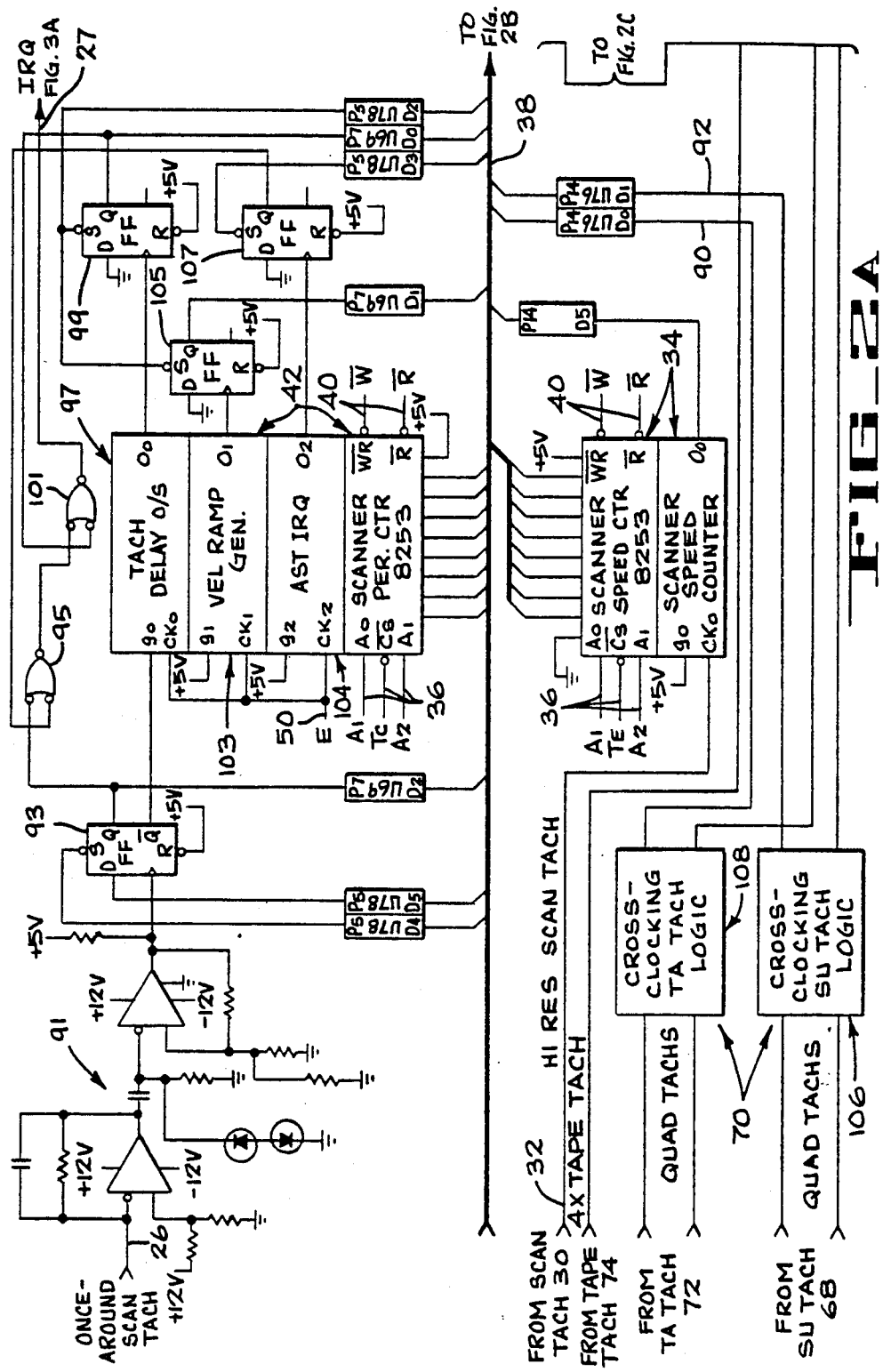
FIGS. 2A, B, C, and 3A, B, C are a combined schematic/block diagram of the block diagram of FIG. 1 depicting further details of the slow speed scanner servo and associated microprocessor control circuitry.

Referring to FIG. 1, there is illustrated for descriptive purposes only, a helical video tape transport 12, including a rotatable scanner 14, a supply reel 16, a takeup reel 18, a tape idler 20, a tape tension sensor 21, and a tape path defined by a magnetic tape 22 extending between the reels and about the tension sensor, the idler and the scanner in generally conventional configuration. A once-around tach 24 is disposed to sense the speed of rotation of the scanner 14, and supplies a conventional tach signal of one pulse per revolution on a line 26 extending to a servo microprocessor/memory 28.

In accordance with the slow speed scanner servo of the invention, a high resolution tach 30 is disposed to sense the scanner rotational speed and to supply a high resolution tach signal of the order of, for example, 400 pulses per revolution, on a line 32 extending to a scanner speed counter 34. The high resolution tach pulses clock the scanner speed counter 34 which thus counts the clock pulses. The count in the counter 34 is sampled and the counter is reset once every television field in response to a field-related interrupt signal supplied to the microprocessor/memory 28, as further shown in FIG. 2A. The counter 34 is selected via generally conventional chip select and read/write signals on respective lines 36, 40 extending from the microprocessor/memory 28. The count in the counter 34 is supplied via a data/control bus 38 to the microprocessor/memory 28, wherein the latter thus continuously monitors the reduced speed of the scanner 14. The slow speed scanner servo thus monitors a preselected scanner speed within a range of speeds substantially below the normal record/playback speed of the scanner, and is enabled by the microprocessor/memory 28 during the processes of unthreading and threading the tape in the reverse direction to allow maintaining the preselected scanner speed.

A scanner period counter 42 and position counter 44 are coupled to the data/control bus 38 and supply digital data in generally conventional fashion to the microprocessor/memory 28 indicative of the scanner time period per revolution, and of the position respectively, when the scanner is running at the normal record/playback speed. Chip select and read/write signals are supplied to the counters 42, 44 via lines 36, 40 respectively, as further depicted in FIGS. 3A, 3B. The two counters 42, 44 are clocked at a 64-times-horizontal (64 H) rate via a 64 H clock signal on a line 50 initiated from system reference and shown in FIGS. 2A, 2B. The scanner position counter 44 is reset by a reference signal of one pulse per field which is supplied on a line 52 and which corresponds to system vertical reference, as further depicted in FIG. 2B.

The inputs to velocity error and phase error digital-to-analog (D/A) converters 54 and 56 respectively, are coupled to the data/control bus 38. The analog outputs thereof are summed to define a scanner error signal, which is fed to a motor drive amplifier (MDA) 62 via a compensating summing amplifier 64. The usual chip select signals are supplied as controls to the converters 54, 56 via the lines 36 from the microprocessor/memory 28, as depicted in FIG. 3C. The resulting scanner driving signal is fed to a scanner motor 66 which rotates the scanner 14 under selected control of the servos depicted in part in FIG. 1 by the scanner period counter 42 and velocity error D/A converter 54, and by the scanner position counter 44 and phase error D/A converter 56. Further description of the servos associated with the scanner period and position counters 42, 44, etc., may be found in the Video Production Recorder Manual of previous mention which is hereby incorporated by reference herein.

A supply reel tach 68 provides a supply reel tach signal indicative of the rotational speed of the supply reel 16, to a diameter counter/tach logic means 70. A takeup reel tach 72 provides a takeup reel tach signal to the means 70, which is indicative of the speed of the takeup reel 18. A tape idler tach 74 supplies a tape tach signal to the means 70 which is indicative of the linear velocity of the tape 22. The output from the diameter counter/tach logic means 70 constitutes binary numbers indicative of the linear speed of the tape relative to the reel speed, and thus are indicative of the diameter of the supply reel tape pack and/or the diameter of the takeup reel tape pack. Thus, when performing the reverse unthreading operation, the means 70 continuously monitor the takeup reel diameter and provide an indication of the end-of-tape point where it is desirable to reduce the rotational speed of the scanner. A typical diameter counter/tach logic circuit may be found, for example, in the Video Production Recorder Manual of previous mention.

A tape speed counter 76 cooperates with the slow speed scanner servo as further described below, and is clocked by the tape tach signal from idler tach 74 to provide a digital signal indicative of the linear tape speed, that is, the speed of the tape when the transport is in the record, playback or shuttle mode of operation. The tape speed signal is supplied to the microprocessor/memory 28 via the data/control bus 38 under control of the chip select and read/write signals on respective lines 36, 40 from the means 28, as depicted in FIGS. 3A, 3B. D/A converters 78, 80 are coupled to the data/control bus 38 and supply analog error signals to supply reel MDA 82 and takeup reel MDA 84 respectively, under control of the chip select signals on lines 36 thereto, as depicted in FIG. 3C. The MDA's 82, 84 supply corresponding drive signals to a supply reel motor 86 and a takeup reel motor 88, respectively, to drive the supply and takeup reels under control of the associated servo circuits in generally conventional fashion.

The supply and takeup tach signals supplied to the diameter counter/tach logic means 70 from respective tachs 68 and 72, are quadrature tach signals. Accordingly, as generally known, each tach signal is defined by a pair of sinusoidal waveforms in quadrature, whereby the tach logic portion of means 70 supplies a pair of binary logic states on lines 90, 92 indicative of the direction of rotation of the supply and takeup reels 16, 18. Lines 90, 92 are coupled to the microprocessor/memory 28 via the data/control bus 38.

A machine control data bus 94 is coupled from the recorder system electronics (not shown) to a machine communication interface depicted by numeral 96. The latter is coupled to the microprocessor/memory 28 as depicted herein via the data/control bus 38, and supplies system control and status information signals for the slow speed scanner servo as well as the other scanner and tape speed servos of FIG. 1, as further illustrated in FIGS. 2A–2C and 3A–3C. A tape-out-of-path sensor device 100 such as conventionally employed to sense the presence or absence of the tape 22 in the tape path, supplies a corresponding tape-out-of-path (or tape-in-path) logic state signal to the interface 96 via a line 102 and the machine control data bus 94. In addition, a tension arm position signal is supplied on a line 98 from the tape tension sensor 21 which extends to the data/control bus 38 via an A/D conversion circuit 103, further depicted in FIG. 3C. The signals are supplied to the microprocessor/memory 28 to indicate respective operating conditions of the transport and/or the tape in the tape path, and are further described with respect to FIGS. 2 and 3.

In the initial process of loading the tape 22 onto the takeup reel 18, the diameter counter/tach logic means 70 generates digital data which are indicative of the nominal hub diameter and thus are indicative of the end-of-tape point of the takeup reel 18. The digital data indicative of the approaching end of the tape, and the end-of-tape point, are stored in the memory of the microprocessor/memory 28. Thereafter, when the tape 22 is withdrawn from the takeup reel 18 in the reverse direction, the diameter of the hub and tape pack continually is monitored by the diameter counter/tach logic means 70. Thus when the diameter of the takeup reel being monitored by the means 70, corresponds to the digital data stored in the memory of microprocessor/memory 28, the latter readily determines the corresponding approaching end of the tape, and the end-of-tape point.

It follows that in the process of unthreading the tape 22 from the takeup reel 18 and the tape path in the reverse direction, the transport 12 generally is in the reverse shuttle mode and is moving the tape at full reverse shuttle speed towards the takeup reel end-of-tape point. At such time, the scanner is rotating normally at the conventional playback speed of, for example 3,600 rpm (for the NTSC color television standard) or 3,000 rpm (for the PAL, SECAM color television standards). The digital value corresponding to the end-of-tape is supplied via the diameter counter/tach logic means 70 to the microprocessor/memory 28. The latter detects the approaching end-of-tape and sends new velocity error data to the D/A converters 78, 80 and MDA's 82, 84, which is indicative of the slower reverse shuttle speed desired for unthreading tape, and which data brakes the reels 16, 18 to the slower speed. By way of example only, such slower speed is of the order of 40 to 50 inches per second (ips). Simultaneously, the microprocessor/memory 28 sends new data to the D/A converters 54, 56 and MDA 62 to brake the scanner 14, while monitoring the digital count from the scanner speed counter 34. When the scanner slows to within a preselected range of speeds, substantially below the scanner normal record/playback speed, the microprocessor/memory 28 enables the slow speed scanner servo, whereby the counter 34 begins to supply a valid corresponding digital count to the microprocessor/memory 28. The count is thereafter continuously compared to a digital number stored in the memory of microprocessor/memory 28, which stored number corresponds to the optimum reduced scanner speed for the reverse unthreading operation. Thus the microprocessor/memory 28 combines with the slow speed scanner servo to maintain the preselected reduced scanner speed commensurate with the preselected reduced reverse shuttle speed, to effect the safe unthreading of the tape 22. By way of example only, the preselected range of scanner speeds substantially below the scanner normal record/playback speed is of the order of 200 to 500 rpm.

As the tape 22 is withdrawn from the tape path, the tape-out-of-path sensor device 100 supplies a logic level status signal to the microprocessor/memory 28 via the line 102, the machine control data bus 94 and the communication interface 96. This also sets a flag in the microprocessor/memory 28 indicating the tape-out-of-path condition. In addition, the tension of the tape 22 against the tape tension sensor 21 is removed, the tension arm of the sensor 21 moves to the stop position, and provides a corresponding position signal to the microprocessor/memory 28 via the line 98 and the A/D conversion circuit 103. Either of these signals cause the microprocessor/memory 28 to disable the transport and scanner servos to turn off both systems.

In accordance with the invention, there is a preferred ratio of scanner circumferential velocity to tape speed for optimizing the safe reverse unthreading of the tape. Namely, the circumferential velocity of the scanner should be the same, or slightly greater than, the speed of the tape as it is moved from about the scanner. Further, a more varying ratio of scanner speed to tape speed preferably is maintained when reverse threading the tape onto the transport, as further discussed below. In general, during the reverse threading and unthreading operations, the scanner velocity is maintained at the same speed, or varies over the order of tens of inches per second (ips) greater than, the tape speed.

In the process of threading the tape 22 in the reverse direction, depicted by numeral 75, that is, from the takeup reel 18 back to the supply reel 16, the tape is placed about the idler guide 20, the tension sensor 21 and the scanner 14 in accordance with the tape path. The end of the tape is placed on the hub of the supply reel 16 and the latter is rotated clockwise a few turns to fully secure the tape to the reel 16. As the tape is spooled onto the reel 16, the takeup reel 18 also rotates clockwise. Thus both reels will be turning in the reverse direction commensurate with the reverse direction 75 of the tape 22.

In accordance with the invention, this condition is indicated by the selected logic states of the status signals on lines 90, 92 supplied by the tach logic circuitry of the diameter counter/tach logic means 70, as further shown in the schematic of FIG. 2A. The signals inform the microprocessor/memory 28 that both the reels are rotating in the reverse direction. In addition, the tension sensor 21 is pivoted away from its stop position by the tension in the tape and provides corresponding status signal to the microprocessor/memory 28. The tape out-of-path flag previously set in the microprocessor/memory 28, indicates that the tape is being threaded back into the tape path. The microprocessor/memory 28 enables the slow speed scanner servo defined in part by tach 30, line 32 and scanner speed counter 34. The microprocessor/memory 28 monitors the count from the counter 34, compares it with a preselected digital number corresponding to the preselected reduced scanner speed which, relative to the speed of the manual threading movement of the tape, is optimum for the reverse threading operation. The digital number is supplied to the D/A converters 54, 56 and MDA 62, whereby the scanner servo maintains the scanner 14 at the preselected reduced speed. This allows safely threading and reeling the tape onto the hub of the supply reel 16 while preventing occurrence of the barber pole effect. The speed of rotation of the scanner 14 is sufficient to aid threading, that is, not too slow which would cause the tape to barber pole, but not fast enough to damage the heads or tape. The preferred speed lies generally within the range of from 50 to 100 rpm, and thus is slower for the reverse threading operation than for the reverse unthreading operation, since in the former the tape is being pulled manually. That is, in the threading process, the speed of the tape is slower and not constant since the tape is threaded and reeled manually. It follows that a more varying ratio of scanner speed to tape speed will occur.

FIGS. 2A, B, C and 3A, B, C illustrate various portions of the circuit of FIG. 1 in schematic, wherein like components are similarly numbered. The slow speed scanner servo is disabled during the normal operating modes of the tape transport 12; that is, when the scanner is operating at the normal speed of 3,600 or 3,000 rpm of previous mention. At such time, the once-around pulses from the tach 74 are supplied via the line 26 to tach processing circuits 91 and a D-type flip-flop 93. The flip-flop is coupled at its true output to the data control bus 38 and to a first AND gate 95, and is coupled at its not-true output to a tach delay one-shot 97 which herein is shown as part of the scanner period counter 42. The one-shot 97 is coupled to a D-type flip-flop 99, whose true output is coupled to the data/control bus 38 and to an AND gate 101. The gate 101 is also coupled to the output of AND gate 95. A velocity ramp generator 103 of counter 42 is supplied with the 64 H clock signal on line 50 and clocks a D-type flip-flop 105. The latter is coupled at its true output to the data/control bus 38. An automatic scan tracking (AST) counter 104 is clocked by the 64 H clock signal on line 50 and, in turn, clocks a D-type flip-flop 107. The true output of the flip-flop 107 is fed to the second input of the AND gate 95. The output of the AND gate 101 provides the field-related interrupt signal of previous mention, herein termed an interrupt request signal (IRQ), which is supplied via a line 27 to the microprocessor/memory 28 to cause it to sample the count in the scanner speed counter 34 at the video field rate. The set inputs of the flip-flops 93, 99, 105, 107 are coupled to the microprocessor/memory 28 via the data/control bus 38.

At such time as the scanner is operating at normal speed, the scanner speed counter 34 is counting high resolution tach pulses but is not being sampled since the associated slow speed scanner servo is not enabled. However, in accordance with the invention, when reverse threading or reverse unthreading is performed during the associated transport operating modes, the slow speed scanner servo selectively is enabled by the microprocessor/memory 28 in response to the latter detecting that the scanner has slowed sufficiently to allow the slow speed scanner servo to monitor the scanner speed. During these operating modes the high resolution tach signal is supplied via the line 32 to the clock input of the scanner speed counter 34, which supplies an 8-bit word indicative of the scanner reduced speed to the data/control bus 38 under control of the chip select (TE, A1, A2) and read/write (R, W) signals on respective lines 36 and 40 from the microprocessor/memory 28 (FIGS. 2A, 3A, 3B). The microprocessor/memory 28 samples the count in the counter 34, and resets the counter, once every television field in response to the previously mentioned field-related interrupt request IRQ on line 27. Obviously, the field-related signal could be supplied from other means.

As previously described in FIG. 1, when performing the reverse unthreading operation, information defining the takeup reel 18 end-of-tape point is required to allow the microprocessor/memory 28 to brake the tape 22 to the preselected reduced shuttle speed, and to simultaneously brake the scanner 14 to its preselected reduced scanner speed prior to enabling the slow speed scanner servo. The means for generating the end-of-tape information is illustrated herein in FIGS. 2A, 2C by way of example as employing the supply and takeup tach signals, takeup and supply cross-clocking tach logic circuits 106, 108, and supply and takeup diameter counters 110, 112, respectively. The diameter counters 110, 112 generate digital numbers indicative of the linear speed of the tape relative to the respective reel speeds, which constitute, in turn, the supply and takeup reel diameters. Thus the takeup reel end-of-tape point data is available to the microprocessor/memory 28 via the data/control bus 38.

In accordance with the invention, the memory of the microprocessor/memory 28 has stored therein various digital numbers corresponding to the preselected speeds at which the tape and scanner are driven during the reverse unthreading and threading operations. Thus during the reverse unthreading operation the memory contains preselected digital numbers corresponding to; the approaching end of the tape; the end-of-tape point; the preselected reduced shuttle speed; and the associated preselected reduced scanner speed. These stored numbers then are compared by the processor with incoming numbers generated by the servos and particularly the counters, to maintain the preselected speeds. In the reverse unthreading operation, the microprocessor/memory 28 is also supplied with the tape-out-of-path status signal via a pair of line 102 of the communication interface 96, or with the tension sensor position status signal (in the stop position) via the line 98 and the A/D conversion circuit 103, wherein either of the signals may be used to turn off all transport functions (FIGS. 3A, 3C). The circuit 103 provides a digital number indicative of the tension servo position, while the tape-out-of-path status signal is identified by the logic level on a bit line of the machine control data bus 94.

During the reverse threading operation the memory of microprocessor/memory 28 contains the flag which is set when the tape 22 previously was pulled out-of-path, and the preselected digital number corresponding to the preselected reduced scanner speed, which generally is slower than the scanner speed in the unthreading mode. The microprocessor/memory 28 is also supplied with both the tension sensor position signal (off stop position) via the line 98, and the tape-in-path signal via the lines 102. The speed of the tape is supplied by an operator manually pulling on the tape.

Since the schematics of FIGS. 2A–2C and 3A–3C are readily apparent from the diagram and previous description of FIG. 1, no further description of FIGS. 2 and 3 is believed necessary.

The description of the slow speed scanner servo illustrated in FIGS. 1-3 is further clarified in the various flow charts of FIGS. 4–8 which depict cooperating routines of the operation thereof. Since the routines are relatively self-explanatory, they are only briefly described herein. To this end, FIG. 4 illustrates a routine for the slow speed scanner servo loop in its relation to the microprocessor/memory 28. The routine is called up once each time that a scanner speed measurement is made (routine of FIG. 5) when the slow speed scanner servo is enabled by the microprocessor/memory 28 in response to the IRQ on line 27. If the scanner is operating too fast, the digital data supplied to the microprocessor/memory 28 causes the latter to set maximum stop current to brake the scanner towards the preselected reduced scanner speed. If the speed is not too fast, the measured speed, i.e., the digital count from the counter 34, is subtracted from the stored desired speed by the microprocessor/memory 28, to supply a scanner speed error signal. The speed error signal is multiplied by a constant value corresponding to the gain of the slow speed servo loop, and an offset value which shifts the zero error value to equal zero volts output from the D/A converter is added to the product by the microprocessor/memory 28. If there is an overflow, maximum stop current is applied, and if there is underflow, maximum start current is applied. The resulting scanner output error is supplied as a drive voltage to the scanner motor 66 via the MDA 62 to maintain the preselected reduced scanner speed.

Accordingly, the scanner motor drive error signal is given by the equation: $E = (S_m - S_d) \times K_1 + K_2$ where $S_m$ = measured speed, $S_d$ = desired speed, $K_1$ and $K_2$ are constants, wherein 0 corresponds to maximum run (start) current, and 255 corresponds to maximum stop (brake) current.

FIG. 5 illustrates the slow speed scanner servo speed measurement routine, which is called up once during every television field. The microprocessor/memory 28 samples the scanner speed from the counter 34 in response to the field reference interrupt request IRQ on line 27 (FIGS. 2A, 3A), and stores the count in memory. The microprocessor/memory 28 resets the counter 34 to start a new count cycle.

FIG. 6 illustrates the slow speed scanner servo startup routine which is called up once to start the servo. The microprocessor/memory 28 enables the slow speed scanner servo by sending error data to the D/A converters 54, 56, whereupon the counter 34 begins its reduced speed count cycle to maintain the preselected reduced scanner speed in accordance with the routine of FIG. 4.

FIG. 7 depicts the reverse threading routine wherein the microprocessor/memory 28 receives the tension arm position signal (off stop) on line 98 indicating the tape 22 is being threaded, and further receives the logic signals on lines 90, 92 indicating that both reels are rotating in the reverse direction. If the tape is in tension, the tension sensor position signal causes the transport braking to be released, and the microprocessor/memory 28 enables the slow speed scanner servo as depicted in the routine of FIG. 6. Upon safe completion of the threading operation, the tension sensor position signal returns to the stop position and causes the microprocessor/memory 28 to re-apply the braking, and to stop the scanner by disabling the drive to the scanner motor.

FIG. 8 depicts the reverse unthreading routine, wherein if the tape is not near the takeup reel end-of-tape point, the tape continues to be moved in the reverse direction at conventional full reverse shuttle speed. Upon approaching the end-of-tape point, the diameter counters 110 and 112 of the diameter counter/tach logic means 70 (FIG. 2C) supply a digital number corresponding to the stored end-of-tape number in the microprocessor/memory 28. The latter, in turn, enables the slow speed scanner servo via the data as depicted by the routine of FIG. 6. The microprocessor/memory 28 also directs the transport to reverse shuttle the tape at the preselected reduced speed of the order of 40 to 60 rpm, by comparing shuttle speed numbers with the preselected stored number in memory. When the tape is withdrawn from the scanner and the tape path, the tension arm position signal (on stop) or the tape-out-of-path signal is used as previously described to stop the reel motors and the scanner.

What is claimed is:

1. A scanner servo system for a tape transport having supply and takeup reels, and a rotating scanner about which the type may be unthreaded and threaded during a corresponding mode of transport operation wherein the tape is moved in the reverse direction, said transport including a normal record/playback mode of operation, comprising:
    a first scanner servo circuit for generating scanner control signals to drive the scanner at a speed commensurate with the normal record playback mode of operation;
    a second scanner servo circuit for generating control signals to controllably maintain the scanner at a preselected reduced speed substantially below the normal scanner record/playback speed; and
    a processor device for enabling the second scanner servo circuit in place of the first scanner servo circuit only in response to the unthreading and threading modes of operation in the reverse tape direction.

2. The system of claim 1 wherein the second scanner servo circuit includes:
    a slow speed measuring circuit coupled to the scanner for supplying in response to the processor device a digital signal indicative of said preselected reduced scanner speed; and
    a drive circuit responsive to the processor device for maintaining the scanner at the preselected reduced speed commensurate with the digital signal supplied by said slow speed measuring circuit.

3. The system of claim 2 wherein said preselected reduced scanner speed is in a range of speeds of the order of from 50 to 500 rpm.

4. The system of claim 2 wherein the slow speed measuring circuit includes:
    a high resolution tach capable of sensing the reduced speed of the scanner; and
    a counter device coupled to the high resolution tach for generating said digital signal indicative of said preselected reduced speed.

5. The system of claim 2 including:
    means for moving the tape at a preselected reduced tape speed equal to or slightly less than the circumferential velocity of said preselected reduced scanner speed.

6. The system of claim 1 further including:
means for determining the end-of-tape when the tape is moved in the reverse tape direction; and
said processor device being responsive to the determining means to enable said second scanner servo circuit when the tape reaches the end-of-tape.

7. The system of claim 6 further including:
a tape reel servo circuit for moving the tape in the reverse direction at selected normal shuttle speeds; and
said processor device being coupled to the tape reel servo circuit for selectively reducing the speed of the tape to a preselected reduced shuttle speed simultaneously with the occurrence of the preselected reduced scanner speed in response to the end-of-tape determined by the determining means.

8. The system of claim 1 further including:
means for detecting a condition of the threading mode of operation where both the supply and takeup reels are rotating in the reverse tape direction; and
said processor device being responsive to the detecting means to enable said second scanner servo circuit.

9. A scanner servo system for controlling a head scanner of a tape transport to prevent damage to the tape and head when unthreading and threading the tape about the scanner in the reverse direction of tape movement, comprising:
a servo circuit including a low resolution tach for driving the scanner at a normal record/playback scanner speed;
a high resolution tach capable of sensing the rotation of the scanner at a preselected reduced speed substantially below said normal record/playback scanner speed;
a digital counter coupled to the high resolution tach;
a processor device coupled to the counter and adapted to selectively enable the high resolution tach and digital counter when the tape is being unthreaded and threaded about the scanner in the reverse direction of tape movement at the scanner preselected reduced speed; and
a drive circuit coupled to the scanner for maintaining the scanner at the preselected reduced speed when enabled by the processor device during the unthreading and threading of the tape about the scanner in the reverse direction.

10. The system of claim 9 including:
means for moving the tape at a preselected reduced tape speed equal to or slightly less than the circumferential velocity of the preselected reduced scanner speed.

11. The system of claim 9 including:
a tape servo circuit for moving the tape at a selected reverse shuttle speed;
means for determining an end-of-tape signal when the tape approaches the end thereof in the reverse direction; and
said processor device being responsive to the determining means to sample the digital counter upon occurrence of the end-of-tape signal while simultaneously reducing the reverse shuttle speed of the tape to a preselected reduced value.

12. The system of claim 9 wherein the transport has supply and takeup reels, the system including:
means for detecting the reverse rotation of both the supply and takeup reels; and
said processor device being responsive to the detecting means to begin sampling the digital counter.

13. The system of claim 12 wherein the means for detecting include quadrature tach circuitry coupled to each of the supply and takeup reels for providing selected logic states indicative of the reverse rotation of the reels.

14. The system of claim 9 wherein:
said high resolution tach generates on the order of 400 tach pulses per scanner revolution;
said digital counter accumulates the tach pulses at a rate commensurate with the speed of the scanner; and
said processor device samples the accumulated tach pulses and resets the digital counter over a preset time interval.

15. A scanner control system for a tape transport having a scanner rotating at a normal scanner speed of the order of 3600 rpm, wherein the tape may be unthreaded and threaded about the scanner in the reverse tape direction, comprising:
a slow speed measuring circuit for sensing the rotational speed of the scanner within a preselected reduced speed in the range of speeds of from 50 to 500 rpm;
a processor device for enabling the slow speed measuring circuit only during unthreading and threading in the reverse tape direction;
a drive circuit for maintaining the scanner at the preselected reduced rotational speed within said reduced range of speeds in response to the processor device; and
means for moving the tape in the reverse tape direction at a preselected reduced speed equal to or slightly less than the preselected reduced scanner speed.

16. A control system for a tape transport having a scanner, first scanner servo means for rotating the scanner at a normal record/playback scanner speed, a tape reel servo for moving a tape at a normal shuttle speed, and microprocessor means for selectively controlling the first scanner servo and the tape reel servo, wherein the tape is unthreaded and threaded in a reverse tape direction about the scanner, comprising:
second scanner servo means responsive to the microprocessor means for maintaining control of the scanner at a preselected reduced speed substantially below the normal record/playback scanner speed, wherein said tape reel servo also is responsive to the microprocessor means to move the tape at a speed equal to or slighly less than the circumferential velocity of the scanner, during only the unthreading and threading of the tape about scanner in the reverse tape direction.

17. A method for unthreading and threading a tape about a scanner when the tape is moved in a reverse direction from a takeup reel to a supply reel, comprising:
moving the tape at a preselected reduced tape speed in the range of speeds of from 50 to 500 rpm;
driving the scanner at a preselected reduced rotational speed corresponding to a circumferential velocity which is equal to or slightly greater than the preselected reduced tape speed; and
maintaining the scanner and the tape at said respective preselected reduced speeds only during the tape unthreading or threading process wherein the tape is being moved in the reverse direction.

18. The method of claim 17 including:
detecting the condition wherein both the supply and takeup reels are rotating in the reverse direction of tape movement; and
supplying a signal indicative of detecting the reverse rotation of the reels to maintain the scanner at said preselected reduced rotational speed.

19. The method of claim 18 including manually moving the tape at the preselected reduced tape speed during threading the tape in the reverse direction.

20. The method of claim 17 including:
providing an end-of-tape signal indicative of the end of the tape from the takeup reel as the tape is moved in the reverse direction;
maintaining the scanner at said preselected reduced rotational speed only upon the detection of the end-of-tape signal; and
maintaining the tape at said preselected reduced tape speed to maintain the ratio of scanner circumferential speed to tape speed.

* * * * *